US008989586B2

(12) United States Patent
Arnold et al.

(10) Patent No.: US 8,989,586 B2
(45) Date of Patent: Mar. 24, 2015

(54) METHOD FOR OPTICAL DATA TRANSMISSION FROM LOW EARTH ORBIT TO EARTH AND CORRESPONDING COMMUNICATION SYSTEM

(71) Applicant: RUAG Schweiz AG, Zürich (CH)

(72) Inventors: Felix Andreas Arnold, Altdorf (CH); Thomas Dreischer, Opfikon (DE)

(73) Assignee: RUAG Schweiz AG, Zurich (CH)

( * ) Notice: Subject to any disclaimer, the term of this patent is extended or adjusted under 35 U.S.C. 154(b) by 36 days.

(21) Appl. No.: 13/675,015

(22) Filed: Nov. 13, 2012

(65) Prior Publication Data

US 2013/0156439 A1 Jun. 20, 2013

(30) Foreign Application Priority Data

Dec. 20, 2011 (EP) .................................... 11194689

(51) Int. Cl.
H04B 10/118 (2013.01)
(52) U.S. Cl.
CPC .................................. *H04B 10/118* (2013.01)
USPC ........... 398/125; 398/121; 398/118; 398/131; 398/128; 455/121; 455/334; 455/9; 370/345; 370/316; 370/475
(58) Field of Classification Search
USPC .......... 398/121, 125, 118, 131, 128; 455/121, 455/334, 9; 370/345, 316, 475
See application file for complete search history.

(56) References Cited

U.S. PATENT DOCUMENTS

| 5,640,673 | A  | * | 6/1997  | Tanabe ........................ 455/12.1 |
| 6,535,314 | B1 | * | 3/2003  | Mendenhall et al. ......... 398/121 |
| 6,839,520 | B1 | * | 1/2005  | Dreischer et al. ............. 398/121 |
| 7,031,272 | B2 | * | 4/2006  | Campanella ................... 370/316 |
| 2004/0001720 | A1 | * | 1/2004 | Krill et al. ...................... 398/125 |
| 2005/0030932 | A1 | * | 2/2005 | Kelly et al. .................... 370/345 |
| 2005/0249501 | A1 | * | 11/2005 | Wolcott et al. ................ 398/118 |
| 2006/0194562 | A1 | * | 8/2006 | Marrah et al. ................. 455/334 |
| 2007/0031151 | A1 | * | 2/2007 | Cunningham et al. ........ 398/131 |
| 2008/0131134 | A1 | * | 6/2008 | Dreischer et al. ............. 398/128 |
| 2011/0103403 | A1 | * | 5/2011 | Derom et al. ................. 370/475 |
| 2011/0171901 | A1 | * | 7/2011 | Wyler ............................... 455/9 |

* cited by examiner

*Primary Examiner* — David Payne
*Assistant Examiner* — Omar S Ismail
(74) *Attorney, Agent, or Firm* — McCormick, Paulding & Huber LLP

(57) ABSTRACT

Optical communications system (10) and method for transmission of payload data (PD) from a low earth orbit satellite (20) to an optical ground terminal (30), the low earth orbit satellite (20) being connectable with the optical ground terminal (30) via an optical downlink channel (DL), and the optical ground terminal (30) being connectable with the low earth orbit satellite (20) via an uplink channel (UC); wherein said uplink channel (UC) is an acquisition and tracking beacon channel by means of a ground beacon (GB) controlled by a point-acquisition-track subsystem (PAT), the ground beacon (GB) comprising a wide angle beam (W) for acquisition and a guidance beam (G) for tracking; and wherein the ground beacon (GB) for the uplink channel (UC) is a pulse position modulated PPM channel.

14 Claims, 4 Drawing Sheets

METHOD FOR OPTICAL DATA TRANSMISSION FROM LOW EARTH ORBIT TO EARTH AND CORRESPONDING COMMUNICATION SYSTEM

CROSS REFERENCE TO RELATED APPLICATION

Applicants hereby claim foreign priority benefits under U.S.C. §119 from European Patent Application No. EP 11 194 689.3 filed on Dec. 20, 2011, the contents of which are incorporated by reference herein.

FIELD OF THE INVENTION

The present invention relates to an optical communications system for transmission of payload data from low earth orbit to earth. The present invention further relates to a method for optical data transmission from low earth orbit to earth.

BACKGROUND OF THE INVENTION

Various systems for optical data transmission from a space station (satellite) travelling on low earth orbit to optical ground terminals are known and deployed. The primary function of these systems is to reliably transmit data from a data source to a optical ground terminal.

Non-geostationary satellites on low earth orbit have line-of sight communication contact with the optical ground terminal for a limited amount of time during each satellite pass. Therefore the achieved speed of downlink channel is of upmost importance, since a great amount of data has to be transmitted to the optical ground terminal in a short amount of time for which a satellite pass lasts.

Furthermore, since the line-of sight communication contact is broken after a short amount of time of a satellite pass and can be established again only at the next satellite pass after a further revolution (or not even), the reliability of the transmission is essential.

An other aspect that has to be taken in consideration in the design of a low earth orbit to earth communication system is the budget as far as the electrical power consumption is concerned. Therefore the less effort is required to obtain the same transfer rate performance the better.

TECHNICAL PROBLEM TO BE SOLVED

The objective of the present invention is thus to provide a method for optical data transmission from low earth orbit to earth and corresponding communication system which provides high speed reliable downlink data transfer while ensuring minimum complexity and reduced energy consumption of the terminals, especially of the space-based terminal.

SUMMARY OF THE INVENTION

The above-identified objectives are solved by an optical communications system for transmission of payload data from low earth orbit to earth, the optical communications system comprising a low earth orbit satellite and an optical ground terminal. The low earth orbit satellite comprises a communication subsystem with a satellite transceiver and a payload data source making payload data available to the communication subsystem. The optical ground terminal comprises a ground transceiver and a point-acquisition-track subsystem. The low earth orbit satellite is connectable with the optical ground terminal via an optical downlink channel while the optical ground terminal is connectable with the low earth orbit satellite via an uplink channel.

Said uplink channel is an acquisition and tracking beacon channel controlled by said point-acquisition-track subsystem, the uplink channel comprising a wide angle beam for acquisition and a guidance beam for tracking. The satellite transceiver is adjustable so that it can be adjusted with respect to the spatial direction of the uplink channel. The uplink channel of the optical communications system of the present invention is a pulse position modulated PPM channel.

The objectives of the present invention are also achieved by a method for optical transmission of payload data from a low earth orbit satellite to an optical ground terminal comprising the steps:

buffering, fetching and grouping of said payload data into frames by a communication subsystem of the low earth orbit satellite;

the optical ground terminal activating an uplink channel connecting the optical ground terminal with the low earth orbit satellite, the uplink channel being an acquisition and tracking beacon channel comprising a wide angle beam for acquisition and a guidance beam for tracking;

said communication subsystem (CS) acquiring said wide angle beam (W) followed by a continuous tracking of the guidance beam (G) of the uplink channel (UC);

transmission of said frames of payload data (PD) by the communication subsystem (CS) when a downlink channel (DL) is available connecting the low earth orbit satellite (20) with said optical ground terminal (30);

the optical ground terminal (30) requesting retransmission via the uplink channel (UC) of unsuccessfully/erroneously received frame(s);

said communication subsystem (CS) retransmitting each frame for which a request for retransmission has been received;

wherein the uplink channel (UC) is pulse position modulated PPM.

ADVANTAGEOUS EFFECTS

In view of the above-identified objective and its solution as provided by the present invention, the most important advantage is that the system and method is the provision of a reliable and high download-rate solution while ensuring the efficiency of the system. The use of a PPM modulated uplink channel ensures great energy efficiency. Furthermore since no inter-symbol interferences are present, the demodulation of PPM signals is effective and has reduced complexity.

BRIEF DESCRIPTION OF THE DRAWINGS

Further characteristics and advantages of the invention will in the following be described in detail by means of the description and by making reference to the drawings which show.

Note: The figures are not drawn to scale, are provided as illustration only and serve only for better understanding but not for defining the scope of the invention. No limitations of any features of the invention should be implied form these figures.

DESCRIPTION OF PREFERRED EMBODIMENTS

Certain terms will be used in this patent application, the formulation of which should not be interpreted to be limited by the specific term chosen, but as to relate to the general concept behind the specific term.

Figure 1:
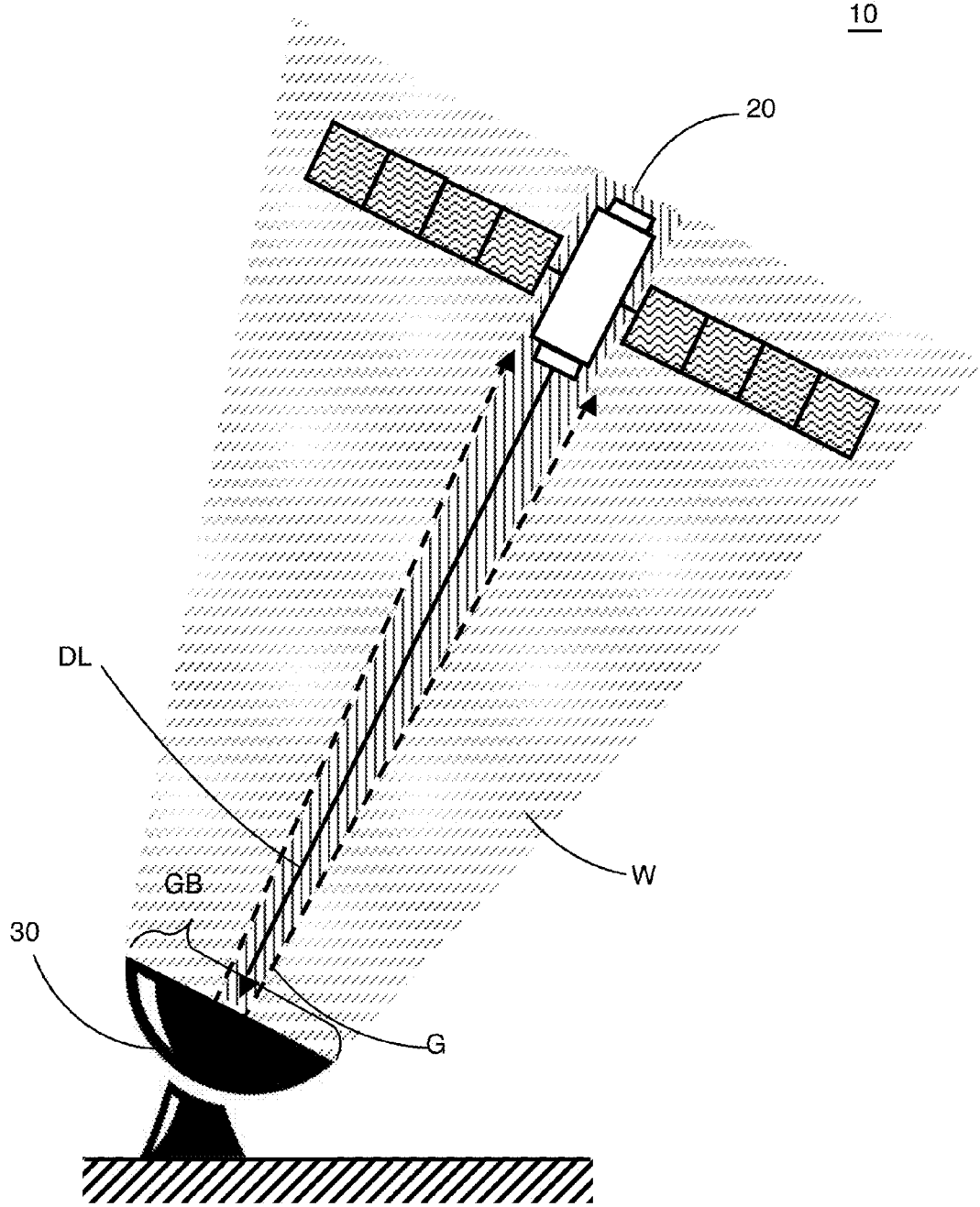
FIG. 1 a symbolic overview of the optical communications system according to the present invention.

As symbolically illustrated on FIG. 1, the optical communications system 10 of the present invention comprises two main functional and structural units: the low earth orbit satellite 20 and the optical ground terminal 30, the low earth orbit satellite 20 being connectable with the optical ground terminal 30 via an optical downlink channel DL, and the optical ground terminal 30 being connectable with the low earth orbit satellite 20 via an uplink channel UC. As symbolically depicted on FIG. 1, the uplink channel UC is an acquisition and tracking beacon channel by means of a ground beacon GB comprising a wide angle beam W and a guidance beam G.

The uplink channel UC is illustratively depicted on the figures with dashed lines while the downlink channel DL is shown with continuous lines.

The optical ground terminals 30 shall be preferably part of optical ground stations. Each optical ground station shall comprise:

at least one optical ground terminal 30 which shall be responsible for communication and point acquisition and tracking PAT;

ground station devices: all electronic items required to support the activity of the optical ground terminal 30; and ground station facilities: all structural items required to support the activity of the optical ground terminal 30.

The exact operation of ground stations may depend on the specific implementation and may vary based on the use case. However the main steps of operation are always similar:

1. The ground station is informed about the next "satellite pass" of one/the low earth orbit satellite 20 through a dedicated electrical interface (e.g. LAN);
2. The ground station facilities and ground station devices "prepare" for the satellite pass. For example the dome opens if the weather sensor confirms that no rain is falling;
3. The optical ground terminal 30 starts up and coordinates its communication subsystem and point-acquisition-track subsystem PAT subsystems. These subsystems will operate mainly independently from each other:
    a) The point-acquisition-track subsystem PAT will point, acquire and track the low earth orbit satellite 20.
    b) The communication subsystem CS will wait for a signal and operate during the whole pass of the low earth orbit satellite 20.
4. Once the satellite pass is over, the received data is transferred to a dedicated memory and then further forwarded (directly or on request).
5. The optical ground terminal 30, the ground station devices and ground station facilities go back into standby mode.

The ground station devices and ground station facilities shall not be described in further detail since these are of the kind known in the art and these are not subject of the present invention.

Step 3. a) above, i.e. the point, acquire and track the low earth orbit satellite 20 point-acquisition-track subsystem PAT follows the scheme of using a ground beacon GB for the uplink channel, the ground beacon GB having a wide angle beam W for acquisition and a guidance beam G for tracking of the low earth orbit satellite 20.

The use of a wide angle acquisition beam coupled with a narrower angle guidance beam for tracking after acquisition is known in the field. However, in known communication links of this type, after the acquisition, the beacon is switched off and a separate communication laser beam is used also as a guidance beam. Contrary to this approach, in the present invention the ground beacon GB is permanently on. Therefore there is no need for a separate ground communication laser beam, since the ground beacon GB for the uplink channel UC has the triple functionality of:

I. Wide angle beam W for acquisition;
II. Guidance beam G for tracking;
III. Low data rate transmitter for the uplink channel UC using PPM modulation.

However, a separate ground communication laser beam may be optionally installed in parallel in case of an extended terminal architecture.

The low earth orbit satellite 20 will scan and acquire the wide angle beam W. Then once it has acquired the ground beacon GB of the optical ground terminal 39, the low earth orbit satellite 20 permanently tracks the guidance beam G of the ground beacon GB. During the communication phase, the low earth orbit satellite 20 directs its satellite transceiver STR in the direction of the optical ground terminal (corrected by the point ahead angle).

Therefore the angle beam W serves for a first rather imprecise acquisition of the approximate direction of the optical ground terminal 30 and the guidance beam G is used for precise tracking of the exact direction.

Figure 2:
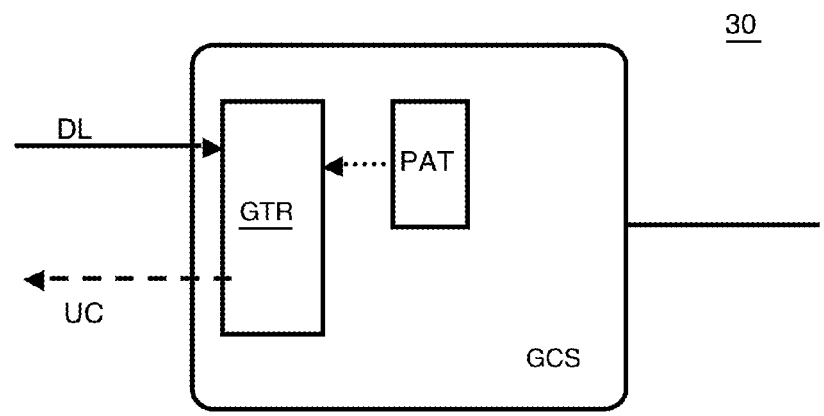
FIG. 2 a structural block diagram of the communication subsystem of the optical ground terminal.

A structural block diagram of the ground communication subsystem GCS of the optical ground transceiver 30 is depicted on FIG. 2. One should note that FIG. 2 shows only the structural blocks relevant for the scope of the present invention. The ground communication subsystem GCS in its entirety may comprise further components of the known types. The uplink channel UC is illustratively depicted on the figures with dashed lines while the downlink channel DL is shown with continuous lines and control signals are depicted with dotted lines.

The two main components of the optical ground terminal 30 are thus the ground transceiver GTR and the point-acquisition-track subsystem PAT. The ground transceiver GTR is of a known kind, comprising an optical transmitter Tx and an optical receiver Rx.

Figure 3:
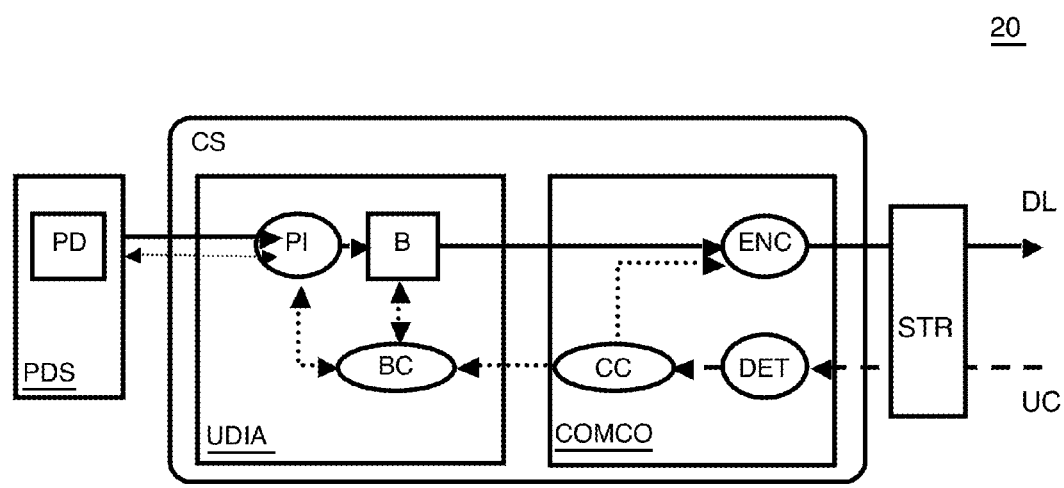
FIG. 3 a structural block diagram of the communication subsystem and payload data source of the low earth orbit satellite according to the present invention.

FIG. 3 shows a structural block diagram of the communication subsystem CS, payload data source PDS and satellite transceiver STR of the low earth orbit satellite 20 according to the present invention.

The satellite transceiver STR is of a known kind, comprising an optical transmitter Tx and an optical receiver Rx. The satellite transceiver STR is adjustable so that it can be adjusted with respect to the spatial direction of the ground beacon GB.

The communications subsystem CS provides the functionality on the digital processing side to reliably transmit payload data PD from the payload data source PDS to the optical ground terminal 30.

The communications subsystem CS comprises two main functional units:

a User Data Interface Adapter UDIA; and
a Communication Controller COMCO.

The communications subsystem CS is responsible for:

Fetching the payload data PD;

Buffering the payload data before transmission by means of a buffer B for temporarily storing said payload data PD before a line-of-sight between the low earth orbit satellite 20 and the optical ground terminal 30 becomes available, thereby making the payload data PD available for fast downlink transmission via the optical downlink channel DL;

Grouping the payload data PD into frames;

Acquiring the uplink channel UC signal;

Make sure that all frames are received by the optical ground terminal 30 by means of an automatic request ARQ protocol (shall be described in detail in later paragraphs) by means of a communications controller CC;

Provide Control and Command (C&C) via a general purpose interface;

Transmitting the modulated and encoded data (via the encoder ENC) electrically to the laser of the satellite transceiver STR (using a RF amplifier)

Receiving the modulated data via the detector DET.

Functional Overview

The communication subsystem's CS main functionality is also depicted on FIG. 3 where control signals are depicted with dotted lines. The objective is reliable transmission of the data. The system has to cope with space loss, atmospheric scintillation effects as well as background noise.

A payload data source PDS is attached to the communication subsystem CS. It provides the communication subsystem CS with payload data PD to be transmitted over the optical downlink channel DL to the optical ground terminal 30. The payload data source PDS may be a mass storage device or any data source that can be interfaced with. The payload data PD is preferably buffered in the CS before transmission. When the downlink channel DL is available, the payload data PD is passed to the protocol stack. There, the payload data PD is grouped into frames in order to be able to synchronize, identify and validate the data at the receiver, i.e. the optical ground terminal 30. The frame header contains information such as frame number, port or destination and a checksum. A relatively low speed uplink channel UC is necessary to request erroneous frames for retransmission.

The communication subsystem CS further converts the frame data into a modulated electrical signal. In order to maximize the data rates, in the preferred embodiment, an on-off keying modulation format is employed for the downlink channel DL. The differentially routed signal is later amplified by an RF amplifier which modulates the laser in an optical subsystem.

Data Flow—Quantitative Example

The flow of the payload data PD is depicted on FIG. 3. In a particularly preferred embodiment, two downlink channels DL and DL2 of 1 Gbps each for a combined downlink capacity of 2 Gbps and one uplink channel UC are implemented (while the solution being scalable to more than two downlink channels as well), the communication channels having the following transfer rates:

Uplink Channel UC Rate: The uplink channel which uses a slow pulse position modulation PPM has a transfer rate of around 100 kbps user data rate.

Downlink Channel DL Rate: The downlink channel uses a fast on-off-keying (OOK) modulation at 2.5 Gbps raw data rate and 2 Gbps user data rate. Typically the data is transferred in groups. The data groups shall be denoted as defined herein.

Payload Data Batch: The payload data batch is the amount of data in the payload data source PDS that is to be transmitted to the optical ground terminal 30 over the time-interval of one satellite pass of the satellite 20. The size of one payload data batch is typically in the order of 100 Gbytes. The amount of time that is available to transmit the data is typically in the order of minutes.

Payload Data Block: The payload data PD is fetched in groups denoted payload data blocks. The size of the payload data block may be restricted or completely defined by the payload interface PI itself.

Organization

In a preferred embodiment of the present invention, the communication subsystem CS is split into two physically distinct entities as shown in FIG. 3 for reasons of flexibility and development ease.

Communication Protocol Stack

Figure 4:
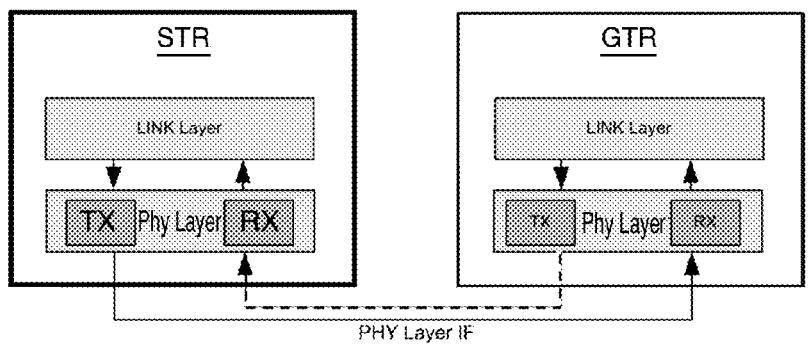
FIG. 4 a functional overview of the protocol stack of the communication between the satellite transceiver and ground transceiver.

As symbolically shown on FIG. 4, the protocol stack of the communication between the satellite transceiver STR and ground transceiver GTR is split into two layers. The distinction into LINK and PHY Layer for Comms is the following:

The PHY (Physical) Layer performs lower level communication function such as signal generation (high speed serial signal), signal acquisition (ADC interface), (de) modulation, en/decoding, synchronization etc. These functions shall be denoted as PHY functions. PHY functions typically do not require software but only hardware logic.

The LINK Layer performs the higher level communication functions such as frame generation, automatic repeat request (ARQ). These functions shall be denoted LINK functions. LINK functions typically require software.

Optionally in further embodiments of the present invention, further layers may be added (e.g. Transport Layer) if additional functionality is requested, e.g. multiplexing.

LINK Layer

The LINK layer has the following functionality

Data is partitioned into frames (for example of a size of ~1 Mb or smaller depending on the performance of the embedded system).

Frames have a unique identifier.

Because the communication channel is inherently unreliable an automatic repeat request (ARQ) protocol is implemented.

As flow control mechanism, the "sliding window" algorithm is implemented.

Selective Repeat ARQ

According to the most preferred implementation, the transmission; request for retransmission and retransmission of frames is implemented in a selective repeat mechanism, preferably an automatic repeat request ARQ mechanism. With a selective repeat mechanism, specific frames can be retransmitted.

With this scheme, the following functionality is implemented:

A 'sliding window' algorithm is implemented.

The sliding window contains the following information:

The current window boundaries

A list of received frames which are acknowledged

A list of received frames not yet acknowledged

A list of frames not yet received

All information of the sliding window need to be kept at the optical ground terminal 30, while low earth orbit satellite 20 only keeps the current window boundaries. This reduces the complexity at the low earth orbit satellite 30 drastically in terms of processing and memory requirements.

Old frames are retransmitted when no ACK has been received.

In order to increase performance by effectively stimulating the retransmission of a package, negative acknowledge NACK messages are employed for requesting retransmission of the unsuccessfully/erroneously received frame(s), preferably by transmitting negative acknowledge NACK signals identifying boundaries of the unsuccessfully/erroneously received range of frame(s) thus requesting the retransmission of the entire range of frames delimited by said boundaries. The implementation allows to request (NACK) a range of frames (i.e. frames 1000-1200) for retransmission. Thus it is no longer necessary to request each of the lost frames individually. Due to the nature of the downlink channel DL, the transmission errors usually occur in bursts. Therefore the possibility of sending negative acknowledge NACK signals identifying boundaries of the unsuccessfully/erroneously received range of frame(s) greatly improves efficiency and ensures better use of the limited capacity of the uplink channel UC.

Figure 5:
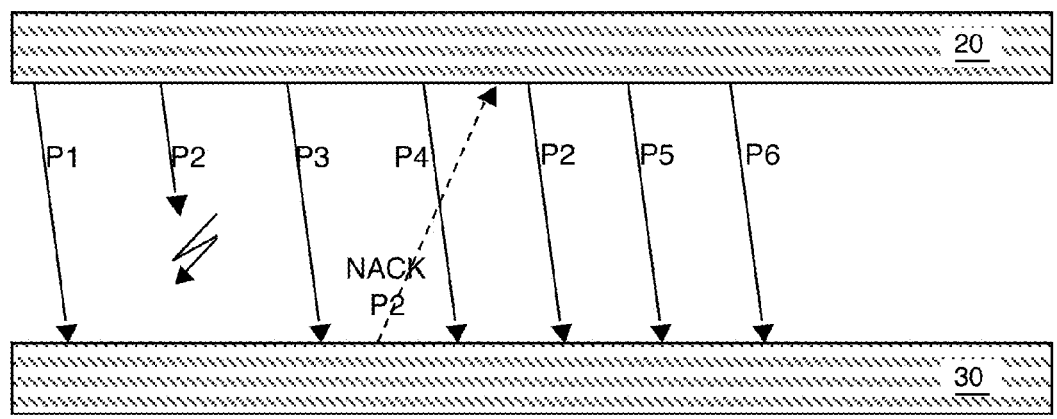
FIG. 5 simplified illustration of the general concept of selective repeat ARQ with negative acknowledge NACK.

The general concept of selective repeat ARQ with negative acknowledge NACK is illustrated in a very simplified manner on FIG. 5, where frame P2 is lost/erroneously transmitted. The optical ground terminal 30 upon receiving frame P3 detects that its sequence number is wrong and sends out a negative acknowledge signal NACK P2 for requesting retransmission of frame P2. The low earth orbit satellite 20, upon receiving the NACK P2 signal retransmits frame P2.

Negative Acknowledge NACK with "Sliding Window"

The selective repeat, negative acknowledge NACK with "sliding window" algorithm operates as follows: The protocol uses a selective repeat protocol. On both sides, the optical ground terminal 30 and the low earth orbit satellite 20, there are two pointers, the head and the tail pointer.

On the optical ground terminal 30 the tail pointer is the index of the oldest frame which was not received yet. The tail pointer is then sent to the low earth orbit satellite 20 where it arrives with a certain time delay. The meaning of the tail pointer on the low earth orbit satellite 20 is that it points to the oldest frame which was not yet confirmed by the optical ground terminal 30 as correctly received.

The head pointer on the optical ground terminal 30 points to the next frame of the normal sequence which should be received. If the received frame has another index, this means either some frames have been lost in between, or the frame is a retransmission of an already sent frame. The head pointer on the low earth orbit satellite 20 is the pointer to the next frame index which should be sent. Each time the low earth orbit satellite 20 sends such a frame, the head pointer is increased by one. The head pointer is not increased in case the frame transmitted is for retransmission. If the distance between the head and the tail pointer on the low earth orbit satellite 20 is larger then a given window size, the low earth orbit satellite 20 can not increase the head pointer anymore and has to wait until the optical ground terminal 30 sends a new tail pointer.

Memory requirements for the "sliding window":

Since the low earth orbit satellite 20 only keeps the current window boundaries, the memory requirements are limited to saving the head and tail of the sliding window;

The complete information of the sliding window need to be kept at the optical ground terminal 30. The required memory for storing the state of the sliding window greatly depends on the throughput, packet length and round trip time. The number of sequence numbers that has to be stored is a multiple (e.g. 10×) of [round trip time]/[time of 1 frame]. Preferably the frame size is chosen such that the ground communication subsystem GCS of the optical ground terminal 30 is able to cope with this processing load.

For the case that the low earth orbit satellite 20 can not increase its head pointer anymore, the low earth orbit satellite 20 will start to retransmit the frames starting from the tail pointer. It will go back to normal transmission as soon as it receives a frame with a new tail pointer from the optical ground terminal 30.

Figure 6:
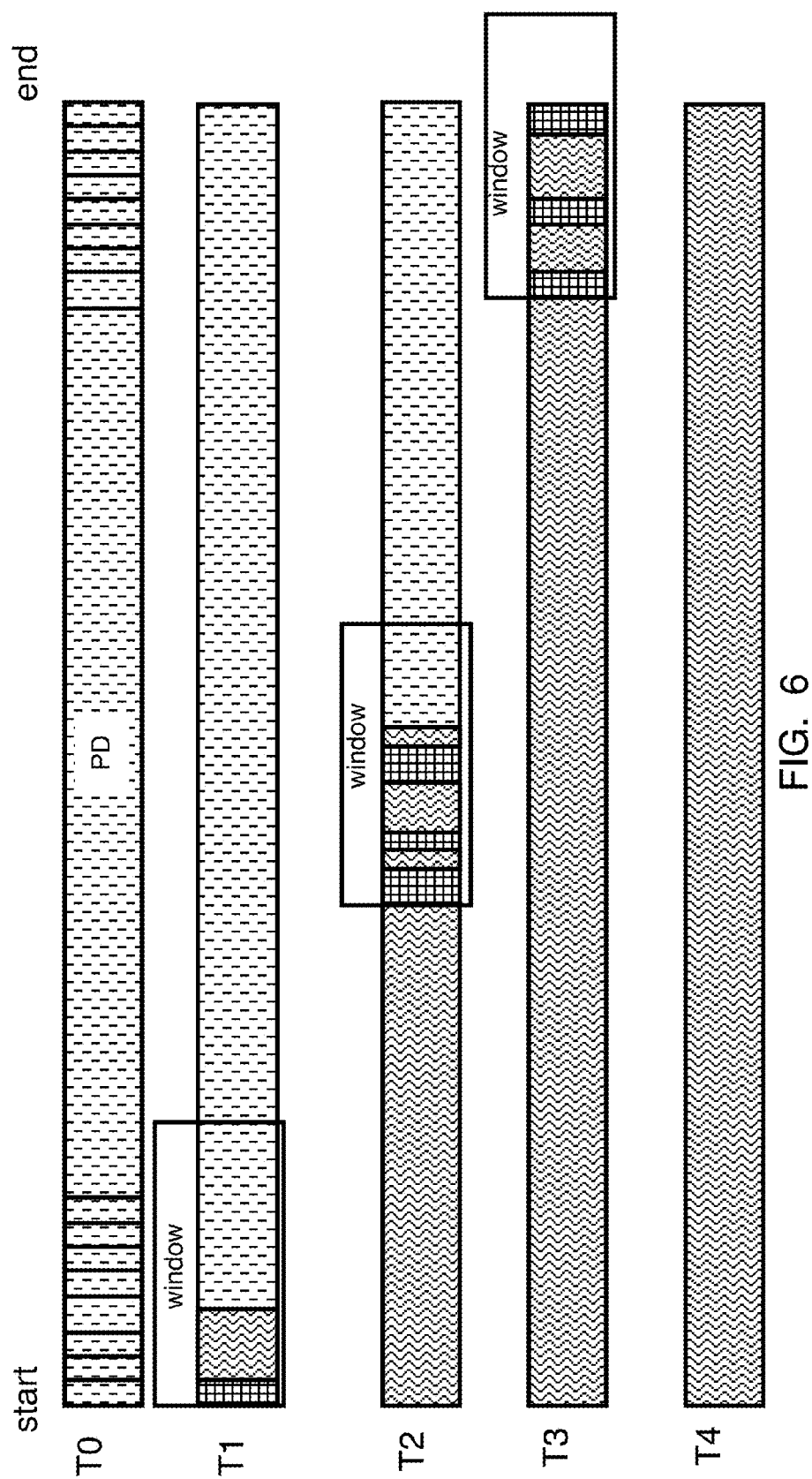
FIG. 6 illustration of the transition flow of data frames according to the sliding window algorithm.

The transition flow of data frames according to the sliding window algorithm are illustrated on FIG. 6 in 5 different moment in time T0 to T4. On FIG. 6, frames not yet received are shown as filled with a dashed pattern, frames successfully received filled with a wavy pattern and frames lost during transmission with a grid pattern.

For the implementation, two handlers have been defined on both sides. A frame received handler, and a frame send handler. The frame send handler is called each time the transmission of the last frame is finished. Then the frame handler selects the frame which should be sent next. The frame receive handler is called each time a frame has been received. It analyzes the content of the frame and then updates the local variables.

Memory: The amount of memory required for storing the state of the sliding window greatly depends on the throughput, frame length and round trip time. The number of sequence numbers that has to be stored is approximately [round trip time]/[time for one frame]. The frame size is chosen such that the embedded system can handle the processing load.

Channel Fading: The optical channel through the atmosphere exhibits fading. That means because of temporarily bad channel conditions all data is lost. The coherence time of this interrupt is substantial—depending on the source between 2 to 50 ms. The ARQ is designed to be able to cope with these interruptions.

Frame Error Rate: With the error correction mechanisms, a resulting frame error rate better than 1 e-2 is assumed. All errors are assumed to be detected because of strong error detection mechanisms.

PHY LAYER

The PHY layer has the following functionality:

Transmitter (Tx);
Generate an error detection code;
Generate header information;
Encode the data, preferably using a forward error correction (FEC).
Receiver (Rx):
Synchronization (PLL);
Demodulation of pulse position modulation (PPM);
Decoding of forward error correction FEC code;
Error detection (e.g. CRC);
Extraction of header information.

Buffer Data Flow

As shown on FIG. 3, the low earth orbit satellite 20 further comprises a buffer B for temporarily storing said payload data PD until a line-of-sight between the low earth orbit satellite 20 and the optical ground terminal 30 becomes available, thereby making the payload data PD available for fast downlink transmission via said optical downlink channel DL even if the payload interface PI may be much slower. Operations related to the buffer B are managed by a buffer control BC.

First of all, the communication controller COMCO commands the user data interface adapter UDIA to fetch a specific part of the payload data PD into the user data interface adapter UDIA buffer B.

As a second step, the communication controller COMCO receives the available memory ranges in terms of pages (e.g. of 32 kBytes) of the user data interface adapter UDIA buffer B. The communication controller COMCO commands the user data interface adapter UDIA to transfer a specific part of the buffer B to the communication controller COMCO. After successfully transmitting a part of the buffer B, the communication controller COMCO commands the user data interface adapter UDIA to erase the corresponding part of the buffer B (e.g. at blocks of size 8*256 kiBytes). Otherwise in case of unsuccessful transmission is detected, the communication controller COMCO requests the user data interface adapter UDIA to transfer a specific part of the buffer B to the communication controller COMCO. In order to facilitate this, the buffer B provides random access to the data blocks of the payload data PD within the buffer B.

It will be understood that many variations could be adopted based on the specific structure hereinbefore described without departing from the scope of the invention as defined in the following claims.

| REFERENCE LIST: | |
|---|---|
| Optical communications system | 10 |
| low earth orbit satellite | 20 |
| satellite transceiver | STR |
| communication subsystem | CS |
| user data interface adapter | UDIA |
| payload interface | PI |
| buffer | B |
| buffer control | BC |
| communication controller | COMCO |
| communications control | CC |
| detector | DET |
| encoder | ENC |
| payload data source | PDS |
| optical ground terminal | 30 |
| ground transceiver | GTR |
| ground communication subsystem | GCS |
| point-acquisition-track subsystem | PAT |
| optical downlink channel | DL |
| second optical downlink channel | DL2 |
| uplink channel | UC |
| ground beacon | GB |
| wide angle beam | W |
| guidance beam | G |

The invention claimed is:

1. Optical communications system (10) for transmission of payload data (PD) from low earth orbit to earth, the optical communications system (10) comprising:
a low earth orbit satellite (20) comprising:
a communication subsystem (CS) with a satellite transceiver (STR),
a payload data source (PDS) making payload data (PD) available to the communication subsystem (CS);
an optical ground terminal (30) comprising:
a ground transceiver (GTR);
a point-acquisition-track subsystem (PAT),
the low earth orbit satellite (20) being connectable with the optical ground terminal (30) via an optical downlink channel (DL), and
the optical ground terminal (30) being connectable with the low earth orbit satellite (20) via an uplink channel (UC); wherein:
said uplink channel (UC) is an acquisition and tracking beacon channel by means of a ground beacon (GB) controlled by said point-acquisition-track subsystem (PAT), the ground beacon (GB) comprising a wide angle beam (W) for acquisition and a guidance beam (G) for tracking;
said satellite transceiver (STR) is adjustable so that it can be adjusted with respect to the spatial direction of the ground beacon (GB);
said ground beacon (GB) for the uplink channel (UC) is a pulse position modulated PPM channel said point-acquisition-track subsystem (PAT) is configured to perform the following steps when informed of a pass-over of the low earth orbit satellite (20):
wake the optical ground terminal (30) from a standby mode; activate the uplink channel (UC) and point to, acquire and track the low earth orbit satellite (20) in order to maintain said downlink channel (DL) and said uplink channel (UC);
de-activate said uplink channel (UC) once the pass-over of the low earth orbit satellite (20) is finished and line-of-sight between the low earth orbit satellite (20) and the optical ground terminal (30) can no longer be maintained; and
switch the optical ground terminal (30) back into said standby mode.

2. Optical communications system (10) according to claim 1, characterized in that the low earth orbit satellite (20) further comprises a buffer (B) for temporarily storing said payload data (PD) until a line-of-sight between the low earth orbit satellite (20) and the optical ground terminal (30) becomes available, thereby making the payload data (PD) available for fast downlink transmission via said optical downlink channel (DL).

3. Optical communications system (10) according to claim 1 characterized in that said satellite transceiver (STR) is configured to scan and acquire said wide angle beam (W), and once acquired, track the uplink channel (UC) of the optical ground terminal (30) with the aid of said guidance beam.

4. Optical communications system (10) according to claim 1, characterized in that the communication subsystem (CS) is configured to convert said payload data (PD) into a modulated electrical signal, preferably into an on-off keying modulated signal, for transmitting in data frames by the satellite transceiver (STR) to the ground transceiver (GTR) via the optical downlink channel (DL).

5. Optical communications system (10) according to claim 1, characterized in that said communication subsystem (CS) comprises:
a user data interface adapter (UDIA), comprising:
a payload interface (PI) for interfacing with said payload data source (PDS); and
a buffer control (BC) for controlling said buffer (B); and
a communication controller (COMCO) comprising:
a communications control (CC) for automatic repeat request of unsuccessfully/erroneously received frame (s);
an encoder (ENC);
a detector (DET).

6. Optical communications system (10) according to claim 1, characterized in that the low earth orbit satellite (20) is further connected with the optical ground terminal (30) via a second optical downlink channel (DL2) for increased downlink speed and for redundancy.

7. A method for optical transmission of payload data (PD) from a low earth orbit satellite (20) to an optical ground terminal (30) comprising the steps:
buffering, fetching and grouping of said payload data (PD) into frames by a communication subsystem (CS) of the low earth orbit satellite (20);
the optical ground terminal (30) activating an uplink channel (UC) connecting the optical ground terminal (30) with the low earth orbit satellite (20), the uplink channel (UC) being an acquisition and tracking beacon channel comprising a wide angle beam (W) for acquisition and a guidance beam (G) for tracking, and being pulse position modulated PPM;

said communication subsystem (CS) acquiring said wide angle beam (W) followed by a continuous tracking of the guidance beam (G) of the uplink channel (UC);

transmission of said frames of payload data (PD) by the communication subsystem (CS) when a downlink channel (DL) is available connecting the low earth orbit satellite (20) with said optical ground terminal (30);

the optical ground terminal (30) requesting retransmission via the uplink channel (UC) of unsuccessfully/erroneously received frame(s);

said communication subsystem (CS) retransmitting each frame for which a request for retransmission has been received;

wherein when informed of a pass-over of the low earth orbit satellite (20), a point-acquisition-track subsystem (PAT) of the optical ground terminal (30) waking the optical ground terminal (30) from a standby mode; activating the uplink channel (UC) and pointing to, acquiring and tracking the low earth orbit satellite (20) in order to maintain said downlink channel (DL) and said uplink channel (UC);

said point-acquisition-track subsystem (PAT) of the optical ground terminal (30) de-activating said uplink channel (UC) once the pass-over of the low earth orbit satellite (20) is finished and line-of sight between the low earth orbit satellite (20) and the optical ground terminal (30) can no longer be maintained; and the optical ground terminal (30) switching back into said standby mode.

8. A method for optical transmission of payload data (PD) according to claim 7, characterized in that the transmission; request for retransmission and retransmission of frames is implemented in a selective repeat mechanism, preferably an automatic repeat request ARQ mechanism.

9. A method for optical transmission of payload data (PD) according to claim 8, characterized in that said request for retransmission is implemented by negative acknowledge NACK signals, the optical ground terminal (30) transmitting a negative acknowledge NACK signal for requesting retransmission of the unsuccessfully/erroneously received frame(s), preferably by transmitting negative acknowledge NACK signals identifying boundaries of the unsuccessfully/erroneously received range of frame(s) thus requesting the retransmission of the entire range of frames delimited by said boundaries.

10. A method for optical transmission of payload data (PD) according to claim 7, characterized in that a sliding window mechanism is implemented, wherein the sliding window contains:
the current window boundaries;
a list of received frames;
a list of received frames not yet acknowledged;
a list of frames not yet received;
wherein the information of the sliding window is stored at the optical ground terminal (30), and wherein frames are retransmitted by the communication subsystem (CS) on request.

11. A method for optical transmission of payload data (PD) according to claim 10, characterized in that from a low earth orbit satellite (20) to an optical ground terminal (30) comprising the steps:

buffering, fetching and grouping of said payload data (PD) into frames by a communication subsystem (CS) of the low earth orbit satellite (20);

the optical ground terminal (30) activating an uplink channel (UC) connecting the optical ground terminal (30) with the low earth orbit satellite (20), the uplink channel (UC) being an acquisition and tracking beacon channel comprising a wide angle beam (W) for acquisition and a guidance beam (G) for tracking, and being pulse position modulated PPM;

said communication subsystem (CS) acquiring said wide angle beam (W) followed by a continuous tracking of the guidance beam (G) of the uplink channel (UC);

transmission of said frames of payload data (PD) by the communication subsystem (CS) when a downlink channel (DL) is available connecting the low earth orbit satellite (20) with said optical ground terminal (30);

the optical ground terminal (30) requesting retransmission via the uplink channel (UC) of unsuccessfully/erroneously received frame(s);

said communication subsystem (CS) retransmitting each frame for which a request for retransmission has been received;

wherein a sliding window mechanism is implemented, wherein the sliding window contains:
the current window boundaries;
a list of received frames;
a list of received frames not yet acknowledged;
a list of frames not yet received;
wherein the information of the sliding window is stored at the optical ground terminal (30), and wherein frames are retransmitted by the communication subsystem (CS) on request, and wherein:
data frames requested to be retransmitted are re-fetched from the buffer (B); and
frames before the window are received, acknowledged and are then deleted from the buffer (B) to free memory space for new payload data (PD).

12. A method for optical transmission of payload data (PD) according to claim 7, characterized in that before transmission, the communication subsystem (CS) converts said payload data (PD) into a modulated electrical signal, for transmitting in data frames via the optical downlink channel (DL), wherein preferably forward error correction scheme is implemented in the encoder (ENC) and/or detector (DET).

13. A method for optical transmission of payload data (PD) according to claim 11, characterized in that the communication subsystem (CS) converts said payload data (PD) into an on-off keying modulated signal, preferably DC balancing added.

14. A method for optical transmission of payload data (PD) according to claim 7, characterized in that, the downlink channel (DL) is available when line-of sight is established between the low earth orbit satellite (20) and the optical ground terminal (30).

* * * * *

UNITED STATES PATENT AND TRADEMARK OFFICE
CERTIFICATE OF CORRECTION

PATENT NO. : 8,989,586 B2  
APPLICATION NO. : 13/675015  
DATED : March 24, 2015  
INVENTOR(S) : Felix Andreas Arnold et al.

Page 1 of 1

It is certified that error appears in the above-identified patent and that said Letters Patent is hereby corrected as shown below:

Column 11, line 56, Claim 11, line 1: after "(PD)" delete "according to claim 10, characterized in that".

Signed and Sealed this  
Ninth Day of February, 2016

Michelle K. Lee  
*Director of the United States Patent and Trademark Office*